United States Patent [19]

Chatterji et al.

[11] Patent Number: 5,672,203
[45] Date of Patent: Sep. 30, 1997

[54] SET RETARDED CEMENTING COMPOSITIONS AND METHODS

[75] Inventors: Jiten Chatterji, Duncan; Rickey L. Morgan; Garland W. Davis, both of Comanche, all of Okla.

[73] Assignee: Halliburton Company, Duncan, Okla.

[21] Appl. No.: 693,743

[22] Filed: Aug. 7, 1996

[51] Int. Cl.$^6$ .................................. C04B 24/12
[52] U.S. Cl. .............. 106/808; 106/727; 106/823; 106/737; 166/293; 166/294; 405/267
[58] Field of Search ................. 106/727, 728, 106/737, 808, 810, 823; 405/267; 166/293, 294

[56] References Cited

U.S. PATENT DOCUMENTS

| | | | |
|---|---|---|---|
| 3,491,049 | 1/1970 | Gibson et al. | 106/808 |
| 4,019,916 | 4/1977 | Golightly et al. | 106/808 |
| 4,582,139 | 4/1986 | Childs et al. | 166/293 |
| 5,017,234 | 5/1991 | Gartner et al. | 106/808 |
| 5,156,679 | 10/1992 | Gartner et al. | 106/808 |
| 5,184,680 | 2/1993 | Totten et al. | 166/293 |
| 5,264,470 | 11/1993 | Eoff | 524/4 |
| 5,273,580 | 12/1993 | Totten et al. | 106/724 |
| 5,295,543 | 3/1994 | Terry et al. | 166/293 |
| 5,327,968 | 7/1994 | Onan et al. | 166/293 |
| 5,332,041 | 7/1994 | Onan et al. | 166/295 |
| 5,355,954 | 10/1994 | Onan et al. | 166/292 |
| 5,383,521 | 1/1995 | Onan et al. | 166/293 |
| 5,398,758 | 3/1995 | Onan et al. | 166/292 |
| 5,458,195 | 10/1995 | Totten et al. | 166/293 |
| 5,488,991 | 2/1996 | Cowan et al. | 166/293 |
| 5,501,277 | 3/1996 | Onan et al. | 166/293 |
| 5,571,318 | 11/1996 | Griffith et al. | 106/808 |

*Primary Examiner*—Michael Marcheschi
*Attorney, Agent, or Firm*—Craig W. Roddy

[57] ABSTRACT

The present invention provides set retarding additives, set retarded hydraulic cement compositions and methods of using the set retarded cement compositions for cementing subterranean zones in wells. A preferred set retarding additive comprises an alkanolamine salt produced by the reaction of a hydroxy carboxy acid, such as tartaric acid, gluconic acid or glucoheptonic acid, with an alkanolamine, such as monoethanolamine, diethanolamine or triethanolamine.

22 Claims, No Drawings

SET RETARDED CEMENTING COMPOSITIONS AND METHODS

BACKGROUND

The present invention relates generally to set retarding additives, set retarded hydraulic cementing compositions and methods of using the set retarded cement compositions for cementing subterranean zones including, but not by way of limitation, a subterranean zone that is penetrated by a well bore.

Hydraulic cement compositions are used for carrying out various operations in oil, gas and water wells including, but not limited to construction and completion operations such as primary cementing and remedial operations such as squeeze cementing. Primary cementing involves the placement of a hydraulic cement composition into the annular space between the walls of a well bore and the exterior of a pipe such as casing disposed therein. The cement composition is pumped into the annular space and allowed to set into an annular cement sheath therein whereby the pipe is bonded to the walls of the well bore by the set cement.

Squeeze cementing techniques usually involve the undesirable movement of oil, gas or water through small holes or cracks in pipe disposed in the well bore; holes, cracks, voids or channels in the annular cement sheath between the pipe and the well bore; annular spaces between the cement sheath and the pipe or the walls of the well bore and permeable zones or fractures in subterranean formations. Such holes, cracks, etc. are plugged by squeezing hydraulic cement compositions therein which harden and form impermeable plugs.

In performing cementing operations in such wells, the cement compositions are often subjected to high temperatures, particularly when the cementing is carried out in deep subterranean zones. The high temperatures can cause premature setting of the cement compositions, i.e., the compositions can not be pumped for long enough times before setting to place them in the zones to be cemented. This requires the use of set retarding additives in the cement compositions which extend the setting times of the compositions so that adequate pumping time is provided in which to place or displace the compositions into desired subterranean zones.

While a variety of cement set retarding additives have heretofore been developed and utilized, known additives can produce unpredictable results. Hydroxy carboxy acids, such as tartaric acid, gluconic acid and glucoheptonic acid are commonly used in oil well cementing as a cement retarder. However, if a slight excess of the hydroxy carboxy acid is used it can over-retard the set of the cement slurry thereby causing it to remain fluid for an extended period of time. This over-retardation will result in extended waiting time prior to resuming drilling and may allow gas to invade the slurry thereby causing unwanted gas migration. Additionally, prior art set retarding additives comprised of materials such as lignosulfonates and synthetic polymers are often expensive to produce.

Therefore, there is a need for improved set retarded cementing compositions and methods of cementing subterranean zones. In particular, there is a need for improved set retarding additives which are relatively inexpensive and bring about predictable cement composition setting times in subterranean environments encountered in wells.

SUMMARY

The present invention provides improved set retarding additives, set retarded hydraulic cementing compositions and improved methods of using such compositions which meet the needs described above and overcome the shortcomings of the prior art. Improved set retarding additives of this invention basically comprise alkanolamine salts produced from the reaction of a hydroxy carboxy acid, such as tartaric acid, gluconic acid or glucoheptonic acid, with an alkanolamine, such as monoethanolamine, diethanolamine or triethanolamine.

The cement retardation properties of these alkanolamine salts are approximately half that of the corresponding acids and when an excess amount of an alkanolamine salt is added to the cement slurry, it will still provide a reasonable thickening time. In addition, cement slurries containing alkanolamine salts maintain low viscosity during the thickening time period which is followed by a hard set with a significant rise in temperature due to a high heat of cement hydration.

A preferred set retarded cementing composition comprises a slurry having a weight of about 16.3 lb/gal and includes a cementitious material such as API Class H Portland cement; sufficient water to form the slurry; fine silica flour available from Halliburton Energy Services of Duncan, Okla. under the trade designation "SSA-1™"; a fluid loss additive available from Halliburton Energy Services of Duncan, Okla. under the trade designation "HALAD®-413"; and an alkanolamine salt produced from the reaction of a hydroxy carboxy acid, such as tartaric acid, gluconic acid or glucoheptonic acid, with an alkanolamine, such as monoethanolamine, diethanolamine or triethanolamine.

The improved methods of the invention for cementing subterranean zones comprise the steps of forming a pumpable set retarded cement composition of the invention, pumping the cement composition into the subterranean zone to be cemented by way of a well bore and allowing the cement composition to set therein.

It is, therefore, a general object of the present invention to provide improved cement set retarding additives, set retarded hydraulic cement compositions and methods of using such compositions in subterranean zones such as well cementing.

Other and further objects, features and advantages of the present invention will be readily apparent to those skilled in the art upon a reading of the description of preferred embodiments which follows.

DESCRIPTION

Reference will now be made in detail to the preferred embodiments of the invention, examples of which are illustrated in the accompanying tables. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the appended claims.

The improved set retarding additives of this invention are relatively inexpensive as compared to many of the prior art set retarders and are effective in retarding the set of cement compositions. The set retarding additives of this invention basically comprise an alkanolamine salt produced from the reaction of a hydroxy carboxy acid, such as tartaric acid, gluconic acid or glucoheptonic acid, with an alkanolamine, such as monoethanolamine, diethanolamine or triethanolamine.

Particularly preferred alkanolamine salts, which are useful as set retarding additives in accordance with the present embodiment of this invention, are formed either by reacting one mole of tartaric acid with two moles of triethanolamine to form triethanolamine tartarate, or by reacting one mole of gluconic acid with one mole of triethanolamine to form triethanolamine gluconate. The reactions are preferably carried out at ambient temperature and pressure although any suitable condition may be used as long as a reaction occurs between the hydroxy carboxy acid and alkanolamine to provide an alkanolamine salt thereof.

More specifically, triethanolamine tartarate is preferably prepared by dissolving one mole of tartaric acid in distilled water to form a water solution of the acid. Two moles of triethanolamine are then slowly added to the water solution of the acid. The produced triethanolamine tartarate solution has an activity of 65.5%.

A similar technique is used to prepare triethanolamine gluconate by dissolving one mole of gluconic acid in distilled water to form a water solution of the acid. One mole of triethanolamine is then slowly added to the water solution of the acid. The produced triethanolamine gluconate solution has an activity of 63.8%.

The cement retardation properties of these alkanolamine salts are approximately half that of the corresponding acids and when an excess amount of the alkanolamine salt is added to the cement slurry, it will still provide a reasonable thickening time. In addition, cement slurries containing alkanolamine salts maintain low viscosity during the thickening time period which is followed by a hard set with a significant rise in temperature due to a high heat of cement hydration.

Preferred set retarded cementing compositions of this invention are basically comprised of a hydraulic cement, sufficient water to form a pumpable slurry of the cement and, as previously described hereinabove, an alkanolamine salt produced from the reaction of an hydroxy carboxy acid, such as tartaric acid, gluconic acid or glucoheptonic acid, with an alkanolamine, such as monoethanolamine, diethanolamine or triethanolamine.

While various hydraulic cements can be utilized in the cement compositions, Portland cement is generally preferred, and can be, for example, one or more of the various types identified as API Classes A–H. These cements are classified and defined in *API Specification for Materials and Testing for Well Cements*, API Spec. 10A, 21st Edition dated Sep. 1, 1991 of the American Petroleum Institute, Washington, D.C. A highly useful and effective cement slurry base for use in accordance with this invention comprises API Class G or H Portland cement mixed with water to provide a density of from about 13.0 to about 20.0 pounds per gallon, more preferably, a cement slurry having a density of from about 14.5 to about 18.0 pounds per gallon and, most preferably, a cement slurry having a density of from about 15.6 to about 16.4 pounds per gallon.

The water used in the cement compositions can be water from any source, provided that the water does not contain an excess of compounds which adversely react with or otherwise affect other components in the cement compositions. The water is present in a cement composition of this invention in an amount sufficient to form a slurry of the cement, preferably a slurry which is readily pumpable. Generally, the water is present in the range of from about 91% to about 17.5% by weight of dry cement in the composition.

The thickening and set times of cement compositions are strongly dependant upon temperature, and to obtain optimum results, the quantity of the alkanolamine salt set retarding additive of this invention required to provide the necessary pumping time at the temperatures to be encountered is included in the cement composition to be utilized. Such quantity can be determined in advance by performing API thickening time tests.

A variety of other additives are often included in cement compositions in addition to the set retarding additives described above. Such additives are well known to those skilled in the art and are included in cement compositions to vary the composition density, increase or decrease strength, control fluid loss, reduce viscosity, increase resistance to corrosive fluids, and the like. Essentially, a cement composition meeting the specifications of the American Petroleum Institute is mixed with water and other additives to provide a cement slurry suitable and appropriate for the conditions existing in each individual well to be cemented.

A particularly preferred set retarded cement composition of this invention is comprised of API Class G or H Portland cement, water in an amount sufficient to form a pumpable slurry and triethanolamine tartarate present in the composition in an amount in the range of from about 1.0% to about 10% and more preferably in excess of 1.1% to about 10% by weight of dry cement therein, the triethanolamine tartarate being produced by the reaction of tartaric acid with triethanolamine.

Another preferred set retarded cement composition of this invention is comprised of API Class G or H Portland cement, water in an amount sufficient to form a pumpable slurry and triethanolamine gluconate present in the composition in an amount in the range of from about 0.1% to about 10.0% by weight of dry cement therein, the triethanolamine gluconate being produced by the reaction of gluconic acid with triethanolamine.

The foregoing preferred set retarded cement slurries have a weight of about 16.3 pounds per gallon. The slurries also comprise fine silica flour available from Halliburton Energy Services of Duncan, Okla. under the trade designation "SSA-1™" and a fluid loss additive available from Halliburton Energy Services of Duncan, Okla. under the trade designation "HALAD®-413".

The improved methods of the invention for cementing subterranean zones including, but not limited to, a zone penetrated by a well bore comprise the steps of forming a pumpable set retarded cement composition of the invention, pumping the cement composition into the subterranean zone to be cemented by way of a well bore and allowing the cement composition to set therein.

In order to further describe the set retarding additives, cement compositions and methods of this invention and to facilitate a clear understanding thereof, the following examples are given.

EXAMPLE 1

Test samples of set retarded compositions of this invention are provided in Table I. For each temperature tested, two samples were included where the triethanolamine tartarate was replaced with either tartaric acid or triethanolamine.

Portions of each of the test samples were placed in a high temperature—high pressure (HT-HP) consistometer test apparatus and tested at the indicated temperatures and pressures according to procedures outlined in API Spec. 10A for thickening time evaluation. The test sample compressive strengths were determined according to procedures outlined in API Spec. 10A for compressive strengths. The results of these tests are also set forth in Table I below.

TABLE I

THICKENING TIMES AND COMPRESSIVE STRENGTH RESULTS

| Temp °F. | Portland Hydraulic Cement | Fine Silica[1] % by Weight Of Cement | Fluid Loss Additive[1] % by Weight Of Cement | Density lb/gal | Tartaric Acid % by Weight Of Cement | Triethanolamine Tartarate % by Weight Of Cement | Triethanolamine % by Weight Of Cement | Thickening Time hrs:min | Temp Rise °F. | Compressive Strength psi |
|---|---|---|---|---|---|---|---|---|---|---|
| 200 | Class H | 35 | 0.3 | 16.3 | 0.25 |      |     | 5:00 | 5 | 2180 |
| 200 | Class H | 35 | 0.3 | 16.3 |      | 1.15 |     | 2:00 | 12 | 2250 |
| 200 | Class H | 35 | 0.3 | 16.3 | 0.25 |      | 0.5 | 2:20 | 10 |      |
| 220 | Class H | 35 | 0.3 | 16.3 | 0.35 |      |     | 3:40 | 0 |      |
| 220 | Class H | 35 | 0.3 | 16.3 |      | 1.61 |     | 2:00 | 10 |      |
| 220 | Class H | 35 | 0.3 | 16.3 | 0.35 |      | 0.7 | 2:10 | 5 |      |
| 240 | Class H | 35 | 0.3 | 16.3 | 0.5  |      |     | 5:04 | 0 | 3158 |
| 240 | Class H | 35 | 0.3 | 16.3 |      | 2.30 |     | 3:06 | 15 | 2897 |
| 240 | Class H | 35 | 0.3 | 16.3 | 0.5  |      | 1.0 | 3:15 | 10 |      |
| 260 | Class H | 35 | 0.3 | 16.3 | 0.8  |      |     | 10:36 | 6 |     |
| 260 | Class H | 35 | 0.3 | 16.3 |      | 3.68 |     | 5:45 | 23 |      |
| 260 | Class H | 35 | 0.3 | 16.3 | 0.8  |      | 1.6 | 5:30 | 8 |      |
| 280 | Class H | 35 | 0.3 | 16.3 | 0.8  |      |     | 7:29 | 0 | 1211 |
| 280 | Class H | 35 | 0.3 | 16.3 |      | 3.68 |     | 5:16 | 0 | 2860 |
| 280 | Class H | 35 | 0.3 | 16.3 | 0.8  |      | 1.6 | 4:50 | 5 |      |
| 300 | Class H | 35 | 0.3 | 16.3 | 1.2  |      |     | 9:43 | 2 |      |
| 300 | Class H | 35 | 0.3 | 16.3 |      | 5.50 |     | 5:44 | 23 |     |
| 300 | Class H | 35 | 0.3 | 16.3 | 1.2  |      | 2.4 | 7:04 | 5 |      |
| 320 | Class H | 35 | 0.3 | 16.3 | 1.4  |      |     | 7:12 | 0 | 1930 |
| 320 | Class H | 35 | 0.3 | 16.3 |      | 6.44 |     | 4:56 | 10 | 3428 |
| 320 | Class H | 35 | 0.3 | 16.3 | 1.4  |      | 2.8 | 5:50 | 12 |     |

[1]"SSA-1 ™" Silica from Halliburton Energy Services, Duncan, Oklahoma
[2]"HALAD ®-413" Fluid Loss Additive from Halliburton Energy Services, Duncan, Oklahoma Since the cement slurry without retarders will set in less than about 1 hour at 220° F. and in about 15 minutes at 320° F., it can be seen from Table I that the set retarding additives of this invention have desired set retarding properties.

EXAMPLE 2

Test samples of set retarded compositions of this invention are provided below in Table II. For each temperature tested, a sample was included where the triethanolamine gluconate was replaced with gluconic acid.

Portions of each of the test samples were placed in a high temperature—high pressure (HT-HP) consistometer test apparatus and tested at the indicated temperatures and pressures according to procedures outlined in API Spec. 10A for thickening time evaluation. The test sample compressive strengths were determined according to procedures outlined in API Spec. 10A for compressive strengths. The results of these tests are also set forth in Table II below.

TABLE II

THICKENING TIMES AND COMPRESSIVE STRENGTH RESULTS

| Temp °F. | Portland Hydraulic Cement | Fine Silica[1] % by Weight of Cement | Fluid Loss Additive[2] % by Weight of Cement | Density lb/gal | Gluconic Acid % by Weight of Cement | Triethanolamine Gluconate % by Weight of Cement | Water % by Weight of Cement | Thickening Time hrs:min | Temp Rise °F. | Compressive Strength psi |
|---|---|---|---|---|---|---|---|---|---|---|
| 200 | Class H | 35 | 0.3 | 16.3 | 0.10 |      | 49.60 | 10:37 | 2 | 2502 |
| 200 | Class H | 35 | 0.3 | 16.3 |      | 0.27 | 49.35 | 3:21 | 2 | 4763 |
| 200 | Class H | 35 | 0.3 | 16.3 | 0.10 |      | 0.50  | 4:05 | 0 |      |
| 220 | Class H | 35 | 0.3 | 16.3 | 0.35 |      |       | 8:43 | 0 |      |
| 220 | Class H | 35 | 0.3 | 16.3 |      | 0.95 |       | 1:53 | 0 |      |
| 220 | Class H | 35 | 0.3 | 16.3 | 0.35 |      | 0.70  | 2:28 | 8 |      |
| 240 | Class H | 35 | 0.3 | 16.3 | 0.725|      | 49.60 | 8:15 | 0 | 1600 |
| 240 | Class H | 35 | 0.3 | 16.3 |      | 2.03 | 48.45 | 3:00 | 0 | 3250 |
| 240 | Class H | 35 | 0.3 | 16.3 | 0.35 |      | 1.00  | 2:28 | 8 |      |
| 260 | Class H | 35 | 0.3 | 16.3 | 0.9  |      |       | 5:38 | 0 |      |
| 260 | Class H | 35 | 0.3 | 16.3 |      | 2.43 |       | 1:45 | 10 |      |
| 260 | Class H | 35 | 0.3 | 16.3 | 0.9  |      | 1.60  | 2:21 | 0 |      |
| 280 | Class H | 35 | 0.3 | 16.3 | 1.5  |      | 49.60 | 6:03 | 0 |     |
| 280 | Class H | 35 | 0.3 | 16.3 |      | 4.05 | 47.29 | 1:42 | 7 | 200 |
| 280 | Class H | 35 | 0.3 | 16.3 | 1.5  |      | 1.60  | 2:05 | 7 |      |
| 300 | Class H | 35 | 0.3 | 16.3 | 2.0  |      |       | 7:14 | 0 |      |
| 300 | Class H | 35 | 0.3 | 16.3 |      | 5.4  |       | 1:53 | 5 |      |
| 300 | Class H | 35 | 0.3 | 16.3 | 2.0  |      | 2.40  | 4:00 | 0 |      |
| 320 | Class H | 35 | 0.3 | 16.3 | 2.5  |      | 49.60 | 8:13 | 0 | 0 |

TABLE II-continued

THICKENING TIMES AND COMPRESSIVE STRENGTH RESULTS

| Temp °F. | Portland Hydraulic Cement | Fine Silica[1] % by Weight of Cement | Fluid Loss Additive[2] % by Weight of Cement | Density lb/gal | Gluconic Acid % by Weight of Cement | Triethanolamine Gluconate % by Weight of Cement | Water % by Weight of Cement | Thickening Time hrs:min | Temp Rise °F. | Compressive Strength psi |
|---|---|---|---|---|---|---|---|---|---|---|
| 320 | Class H | 35 | 0.3 | 16.3 |  | 6.75 | 45.74 | 1.56 | 3 | 350 |
| 320 | Class H | 35 | 0.3 | 16.3 | 2.5 | 2.80 | 2.07 | 8 | | |

[1] "SSA-1 ™" Silica from Halliburton Energy Services, Duncan, Oklahoma
[2] "HALAD ®-413" Fluid Loss Additive from Halliburton Energy Services, Duncan, Oklahoma Since the cement slurry without retarders will set in less than about 1 hour at 220° F. and in about 15 minutes at 320° F., it can be seen from Table II that the set retarding additives of this invention have desired set retarding properties.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A set retarded cement composition comprising:
   a hydraulic cement;
   sufficient water to form a pumpable slurry; and
   an alkanolamine salt present in the cement composition in an amount in the range of from in excess of 1.1% to about 10% by weight of dry cement therein.

2. The composition of claim 1 wherein said alkanolamine salt is selected from the group consisting of triethanolamine tartarate, triethanolamine gluconate, and triethanolamine glucoheptonate.

3. The composition of claim 1 wherein the slurry has a density in the range of from about 13.0 to about 20.0 pounds per gallon.

4. The composition of claim 1 wherein said water is present in an amount in the range of from about 91% to about 17.5% by weight of dry cement therein.

5. The composition of claim 1 further comprising fine silica flour.

6. The composition of claim 1 further comprising a fluid loss additive.

7. A method of cementing a subterranean zone comprising the steps of:
   forming a set retarded cement composition comprising:
      a hydraulic cement,
      sufficient water to form a pulpable slurry, and
      an alkanolamine salt present in the cement composition in an amount in the range of from in excess of 1.1% to about 10% by weight of dry cement therein;
   pumping the cement composition into the subterranean zone to be cemented; and
   allowing the cement composition to set therein.

8. The method of claim 7 wherein said alkanolamine salt is selected from the group consisting of triethanolamine tartarate, triethanolamine gluconate, and triethanolamine glucoheptonate.

9. The method of claim 7 wherein the slurry has a density in the range of from about 13.0 to about 20.0 pounds per gallon.

10. The method of claim 7 wherein said water is present in an amount in the range of from about 91% to about 17.5% by weight of dry cement therein.

11. The method of claim 7 further comprising fine silica flour.

12. The method of claim 7 further comprising a fluid loss additive.

13. A set retarded cement composition comprising:
   a hydraulic cement;
   sufficient water to form a pumpable slurry; and
   triethanolamine gluconate present in the cement composition in an amount in the range of from about 0.1% to about 10% by weight of dry cement therein.

14. The composition of claim 13 wherein the slurry has a density in the range of from about 13.0 to about 20.0 pounds per gallon.

15. The composition of claim 13 wherein said water is present in an amount in the range of from about 91% to about 17.5% by weight of dry cement therein.

16. The composition of claim 13 further comprising fine silica flour.

17. The composition of claim 13 further comprising a fluid loss additive.

18. A method of cementing a subterranean zone comprising the steps of:
   forming a set retarded cement composition comprising:
      a hydraulic cement,
      sufficient water to form a pumpable slurry, and
      triethanolamine gluconate present in the cement composition in an amount in the range of from about 0.1% to about 10% by weight of dry cement therein;
   pumping the cement composition into the subterranean zone to be cemented; and
   allowing the cement composition to set therein.

19. The method of claim 18 wherein the slurry has a density in the range of from about 13.0 to about 20.0 pounds per gallon.

20. The method of claim 18 wherein said water is present in an amount in the range of from about 91% to about 17.5% by weight of dry cement therein.

21. The method of claim 18 further comprising fine silica flour.

22. The method of claim 18 further comprising a fluid loss additive.

* * * * *